United States Patent [19]
Nagaraj et al.

[11] Patent Number: 5,970,237
[45] Date of Patent: *Oct. 19, 1999

[54] DEVICE TO ASSIST SOFTWARE EMULATION OF HARDWARE FUNCTIONS

[75] Inventors: Ravi Nagaraj; Gary A. Solomon, both of Hillsboro, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,153

[22] Filed: Nov. 19, 1996

Related U.S. Application Data

[63] Continuation of application No. 08/502,659, Jul. 14, 1995, abandoned, which is a continuation of application No. 08/259,477, Jun. 14, 1994, abandoned.

[51] Int. Cl.⁶ ................................................. G06F 11/00
[52] U.S. Cl. ............................................................ 395/500
[58] Field of Search .................................... 364/488, 489, 364/490, 491, 578; 395/500, 412, 414, 415, 416, 417, 418, 421.03, 421.05

[56] References Cited

U.S. PATENT DOCUMENTS

| | | | |
|---|---|---|---|
| 4,084,235 | 4/1978 | Hirtle et al. | 395/500 |
| 4,514,805 | 4/1985 | McDonough et al. | 364/200 |
| 4,727,480 | 2/1988 | Albright et al. | 395/500 |
| 4,763,242 | 8/1988 | Lee et al. | 395/500 |
| 4,875,186 | 10/1989 | Blume, Jr. | 395/500 |
| 4,926,322 | 5/1990 | Stimac et al. | 395/500 |
| 5,093,776 | 3/1992 | Morss et al. | 395/500 |
| 5,155,838 | 10/1992 | Kishi | 395/500 |
| 5,274,826 | 12/1993 | Kardach et al. | 395/725 |
| 5,274,834 | 12/1993 | Kardach et al. | 395/725 |
| 5,357,628 | 10/1994 | Yuen | 395/575 |
| 5,392,420 | 2/1995 | Balmer et al. | 395/500 |
| 5,437,039 | 7/1995 | Yuen | 395/725 |
| 5,475,829 | 12/1995 | Thome | 395/479 |

OTHER PUBLICATIONS

Donalson, Douglas et al, DISC: Dynamic Instruction Stream Computer An Evaluation of Performance, Jan. 5, 1993, IEEE, pp. 448–456.

Cates, Ron, An ASIC RISC–Based I/O Processor for Computer Applications, IEEE, Jun. 1, 1990, 50–55.

*Primary Examiner*—Kevin J. Teska
*Assistant Examiner*—Matthew Clay Loppnow
*Attorney, Agent, or Firm*—Blakely, Sokoloff, Taylor & Zafman LLP

[57] ABSTRACT

Apparatus and method of assisting software emulation of hardware functions in a processor. During a read cycle on an address bus, an address that is within a predetermined address range is stored in a trap register and a Type-of-Cycle bit in the trap register is set to the read state. If an Issue-SMI-on-Next-Access bit in the trap register is set to the on state, a system management interrupt is issued to the processor. During a write cycle, data on the data bus is stored in a data field of the trap register, the address is stored in the address field of the trap register and the Type-of-Cycle bit is set to the write state. A system management interrupt is issued if the Issue-SMI-on-Next-Access bit is set to the on state. Then the Issue-SMI-on-Next-Access bit is set to the off state. The Type-of-Cycle bit of the trap register is set if the system management interrupt is detected at the processor. Data from the processor is placed into the data field of the trap register if the Type-of-Cycle bit is set to the read state. An I/O restart operation of the processor is then invoked. The Type-of-Cycle bit of the trap register is read if the system management interrupt is detected at the processor. Data from the processor is stored into the data field of the trap register if the Type-of-Cycle bit is set to the read state. An I/O restart operation of the processor is then invoked. The contents of the data field of the trap register are placed on the data bus if the Issue-SMI-on-Next-Access bit is set to the off state. Then the Issue-SMI-on-Next-Access bit is set to the on state.

22 Claims, 4 Drawing Sheets

DEVICE TO ASSIST SOFTWARE EMULATION OF HARDWARE FUNCTIONS

This is a continuation of application Ser. No. 08/502,659, filed Jul. 14 1995, now abandoned, which is a continuation of application Ser. No. 08/259,477, filed Jun. 14. 1994, now abandoned.

BACKGROUND OF THE INVENTION

1. Field of the Invention

The present invention is related to personal computers and more specifically to an apparatus for software emulation of hardware tasks in an IBM personal computer (PC) architecture independent of and fully transparent to an operating system running on the PC.

2. Prior Art

The IBM personal computer (PC) architecture has become a de-facto standard for personal computers over the past decade. The main hardware part of the computer is called a mother board which is a large printed circuit board that has plugged into it the computer's central processing unit (CPU) which is an Intel brand microprocessor, random access memory (RAM), microprocessor support chips and has expansion slots that receive add-in cards. The IBM PC architecture uses a Microsoft brand disc operating system (DOS) as the software program that controls the overall operation of the computer. In the course of its development, an open system architecture of the IBM PC has allowed and fostered the development of several technologies as add-in card functions, such as sound cards. Increasingly, these functions are being absorbed onto the motherboard.

The pressure to reduce cost is upon all PC system manufacturers. At the same time, the processing power of the microprocessor is increasing rapidly. These circumstances make software emulation of certain previously hardware tasks very attractive. One of the problems in achieving this software emulation is the unruly nature of software written for the Microsoft DOS operating system. Application programs frequently bypass the operating system and some take over completely, addressing the hardware directly. This makes software emulation of tasks very difficult.

It is therefore desirable to provide a method and apparatus for software emulation of hardware tasks in an IBM personal computer (PC) architecture independent of and fully transparent to the operating system running on the PC.

SUMMARY OF THE INVENTION

The invention provides a logic that monitors an address bus for addresses that are within a predetermined address range and decodes an address that is within the address range. The address is stored in a trap register if a read cycle is underway. The trap register includes an address field, a data field, an Issue-SMI-on-Next-Access bit that can be set to an on state and an off state, and a Type of Cycle bit that can be set to a write state and set to a read state. Logic is provided for setting the Type-of-Cycle bit to the read state if a read cycle is underway. The logic issues a system management interrupt to the processor if the Issue-SMI-on-Next-Access bit is set to the on state. The logic stores data on a data bus in the data field of the trap register and the address in the address field of the trap register if a write cycle is underway. Logic is provided for setting the Type-of-Cycle bit to the write state. The logic issues a system management interrupt if the Issue-SMI-on-Next-Access bit is set to the on state.

An advantage of this invention is that the invention allows IBM PC manufacturers to provide lower cost products to their customers.

The foregoing and other features and advantages of the invention will be apparent from the following more particular description of a preferred embodiment of the invention as illustrated in the accompanying drawings.

DESCRIPTION OF THE PREFERRED EMBODIMENT

Figure 1:
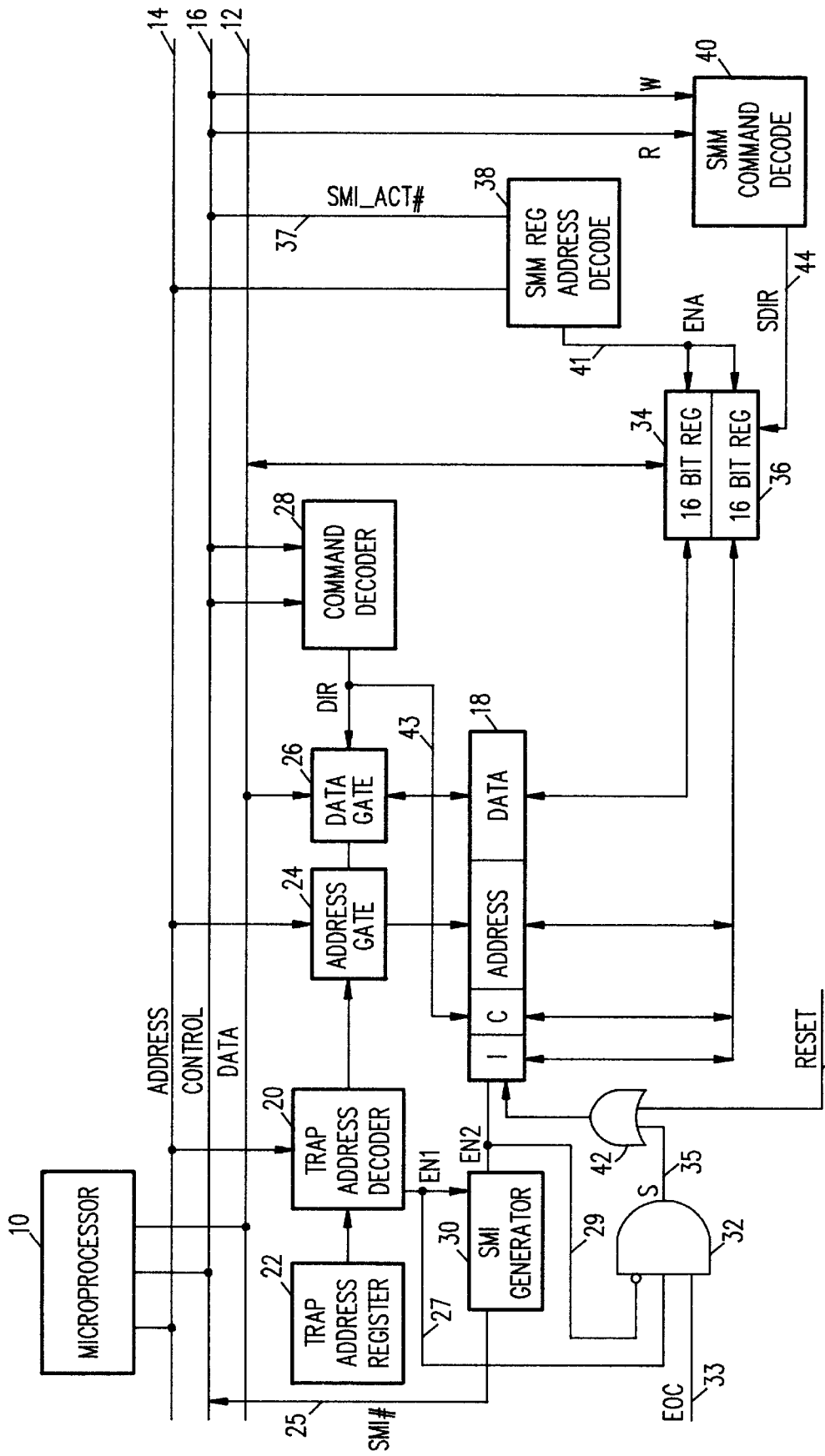
FIG. 1 is a diagram of a personal computer in which the present invention is embodied.

Refer to FIG. 1. A microprocessor (10) Is connected to a data bus (12), an address bus (14) and a control bus (16). A trap mechanism and a system management mode (SMM) trap access mechanism are provided. The trap access mechanism is comprised of trap register (18), trap address registers (22), trap address decoder (20), address gate (24), data gate (26), command decode (28), SMI generator (30), and I Flag Set block (32). The SMM trap access mechanism consists of four blocks, a 16 bit data register and gate (34), a 16 bit address, C flag register and I flag gate (36), an SMM register address decode block (38), and an SMM command decode block (40).

Trap Mechanism

The trap register (18) includes an address field, a datafield, a C field and an I field. The C field is one bit which shows the type of cycle which occurred. This bit can be set to a Write (1) state or a Read (0) state. The I field is one bit which can be set to a 1 to indicate issue of a system management interrupt (SMI) on a next trap hit or set to a 0 to disable issue of SMI on a next trap hit.

The trap address Decoder (20) compares addresses stored in the trap Address Range Registers (22) and the address on the address bus (14) in the current bus cycle. If the current bus cycle address is one of the addresses within the trap range (a trap hit), the trap address decoder asserts an enable signal, EN1 (27) to the Address Gate (24), the data gate (26), the Command decode (28) and the SMI generator (30).

The Address gate (24) is unidirectional and passes the address on the address bus (14) to the address field of the trap register where it is latched. The Command Decode (28) generates a direction signal DIR (43) to the data gate (26) by decoding the read (R) and write (W) commands on the control bus (16). The data gate (26), when enabled by the signal EN1 from the trap address decoder (20), passes data on the data bus (12) to the data field of the trap register if the DIR signal is asserted on (1) and passes data from the trap register data field to the data bus if the DIR signal is unasserted, off (0). The DIR signal is latched into the C field of the trap register.

The SMI generator (30) is enabled by two enable signals, EN1 (27) from the trap address decoder (20) and EN 2 (29) from the I bit of the trap Register (18). When both enable signals are set (1), the SMI generator generates an SMI# interrupt (25) signal to the microprocessor (10).

An internal end of cycle signal EOC (33) signals the end of a bus cycle and is an output from a bus cycle control state machine which is not shown in FIG. 1. The I Flag Set block (32) asserts a signal S (35) when EN1 is active (1), EN2 (29)

is not active (0), and EOC is active at the end of the bus cycle. The signal S (35) and the reset signal (23) are combined in an OR (42), the output of which drives the I flag in the trap register (18). The I bit in the trap register is set by the output of OR (42) which is the logical or of the S line (35) and system reset (23).

System Management Mode (SMM) Trap Access Mechanism

The SMM register address decode block (38) decodes addresses only during system management mode (SMM). This is controlled by the signal SMI_ACT# (37) from the Microprocessor (10). The SMM register address decode block matches two fixed addresses in the I/O address space and produces corresponding enable signals ENA (41) to the two 16 bit gates 34 and 36. The SMM command decode block (40) decodes the Read (R) and write (W) commands and produces a direction control signal SDIR (44), the state of which signals either a read or write operation. SDIR controls the direction of gates (34) and (36). Access of the trap register (18) through the SMM access mechanism does not generate a trap or an SMI.

Software Emulation Mechanism

The software emulation mechanism works as follows:

During initialization, a program which can emulate a hardware function is placed in a System Management RAM area in a random access memory (RAM) in the microprocessor (10). The trap address range registers (22) are set to the I/O address range for the hardware device to be emulated.

When an application program running on the microprocessor (10) desires to use the hardware function, it accesses the hardware I/O address range.

Write to an I/O Space

If the application program writes to an I/O space, the following sequence occurs:

a. The trap address decode (20) sets EN1 (1) which enables the data (26) and address gates (24) and the Command decode (28). The Command decode sets the DIR signal to "on" (1) for write.

b. Address, data and the direction bit are latched into the trap register (18).

c. The SMI generator (30) is enabled by EN1 and EN2. The SMI# signal is generated to the Microprocessor. The write bus cycle is terminated normally.

d. The Microprocessor (10) enters SMM. The SMI_ACT# signal goes active (0). This enables the SMM register address decode mechanism.

e. Program control is passed to the device emulation routine in system management RAM. The device emulation routine reads the two 16 bit SMM trap access ports.

f. The device emulation routine comprehends what actions need to be performed and emulates the hardware device.

g. When the desired emulation functions are completed, the routine terminates and exits SMM.

h. Control passes back to the application program. The application program notes that the hardware port has been written and continues execution.

Read from an I/O Space

If the application program reads from an I/O space, the following sequence occurs:

a. The trap address decode (20) sets EN1 (1) which enables the data (26) and address gates (24) and the Command decode (28). The Command decode sets the DIR signal to "off" (0) for read.

b. The address and the direction bit are latched into the trap register (18). Data from the data field of the trap register is put on the data bus. This is erroneous data but this is tolerable since the cycle is to be retried at a later time.

c. The SMI generator (30) is enabled by EN1 and EN2. The SMI# signal is generated to the Microprocessor (10). The read bus cycle is terminated normally.

d. The Microprocessor enters SMM. The SMI-ACT# signal goes active (0). This enables the SMM register address decode mechanism.

e. Program control is passed to the device emulation routine in system management RAM. The device emulation routine reads the two 16 bit SMM trap access ports.

f. The device emulation routine comprehends what actions need to be performed and emulates the hardware device.

g. When the desired emulation functions are completed, the device emulation routine writes the results expected by the application program from the hardware into the trap register. The device emulation routine writes the appropriate data value into the data field of the trap register thorough the SMM access mechanism. It also resets the I flag to 0.

h. The device emulation routine sets the I/O cycle restart bit in the register map of the Microprocessor. It then terminates and exits SMM.

i. The Microprocessor retries the previous I/O access before passing control back to the application program.

j. The trap address decode (20) sets EN1 (1) which enables the data (26) and address gates (24) and the command decode (28). The command decode sets the DIR signal to "off" (0) for read.

k. The address and the direction bit are latched into the trap register (18). Data from the data field of the trap register is put on the data bus. This time the data is valid.

l. The SMI generator (30) is disabled since EN2 is low (0). The SMI# signal is not generated to the Microprocessor. The read bus cycle is terminated normally.

m. At the end of the cycle, the I flag set block (32) asserts (1) the 'S' signal (35). The I bit is set to 1.

n. Control passes back to the application program. The application notes that the hardware port has been read and continues execution with the data that was returned.

Application Software Program Flow

Figure 2:
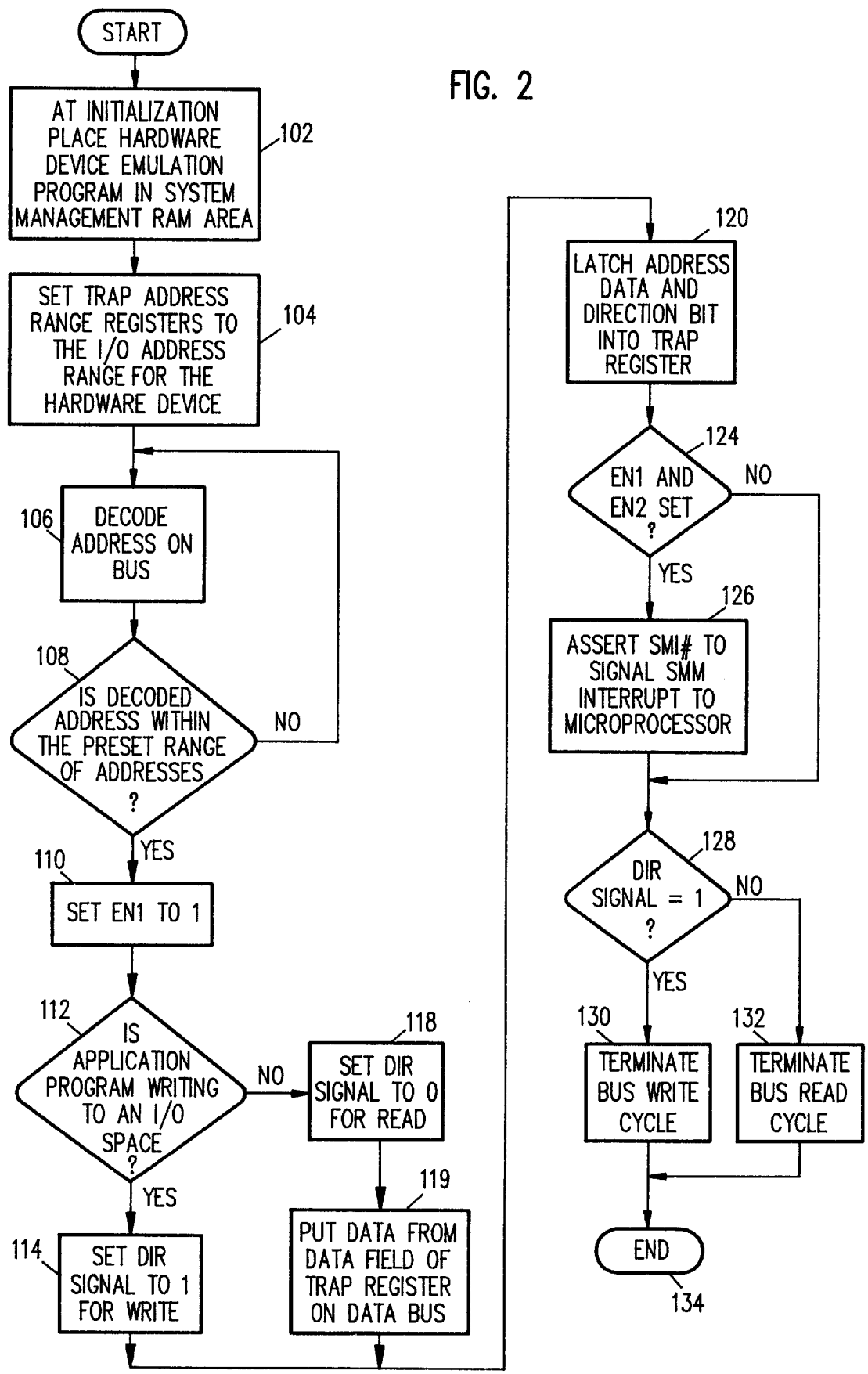
FIG. 2 and FIG. 3 comprise a flow diagram of a control program in accordance with the invention, and, FIG. 4 is a flow diagram of a device emulation routine called by the program of FIG. 3.

Refer to FIG. 2. At initialization, a program which can emulate a hardware function is placed in the System Management RAM area (102). The Trap Address Range Registers are set to the I/O address range for the hardware device (104). The software monitors the address range decoder and decodes an address on the bus (106). If an address on the bus is decoded that is within the range of addresses fixed or programmed in the address decoder, a YES results from the decision block (108). EN1 is set (110) to enable the data and address gates and the Command decode.

If the application program is writing to an I/O space a YES results from decision block (112). The DIR signal is set to (1) for write (114). If the application program is not writing to an I/O space a NO results from decision block (112). The DIR signal is set to (0) for read (118). The data from the data field of the trap register is put on the data bus (119).

For either a read or a write, the flow proceeds to block (118). The address, data and the direction bit are latched into the Trap register (120). EN1 and EN2 are both set to enable the SMI generator (124). The interrupt signal SMI# is asserted to invoke system management mode (SSM) by interrupting the microprocessor (126). If the DIR signal is set to (1) then the write cycle is terminated (130). If the DIR signal is set to (0) then the read cycle is terminated (132). In either case the flow ends (134).

System Management Mode

Figure 3:
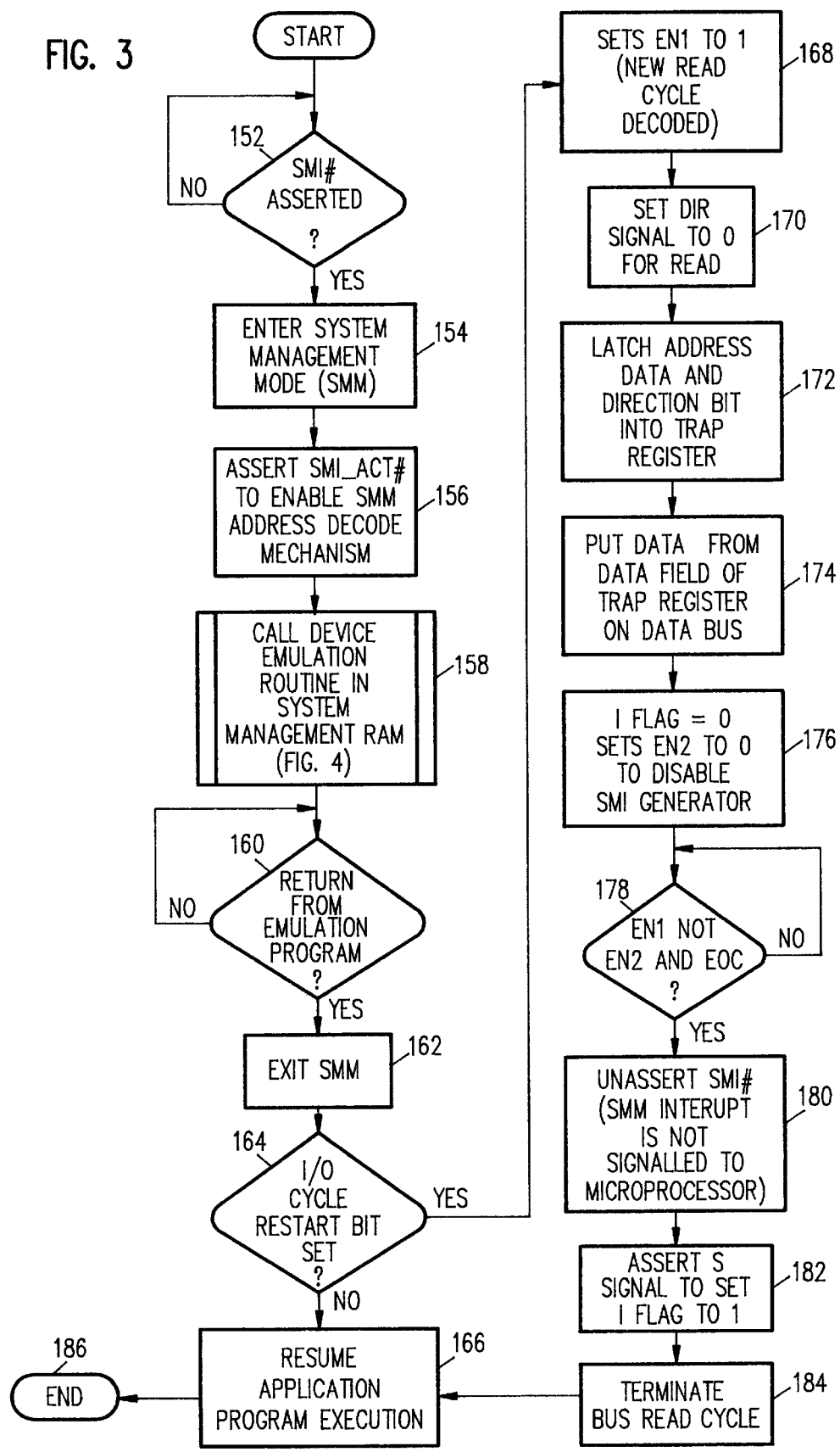

Refer to FIG. 3. If the system management interrupt line (SMI#) is asserted (152) the microprocessor enters SMM system management mode (154). The SMI_ACT# signal is asserted (156) to enable the SMM address decode mechanism. At this point, program control is passed to the device emulation routine that was placed in system management RAM by calling the device emulation routine (158) described below with respect to the program flow of FIG. 4.

Device Emulation Software Program Flow

Figure 4:
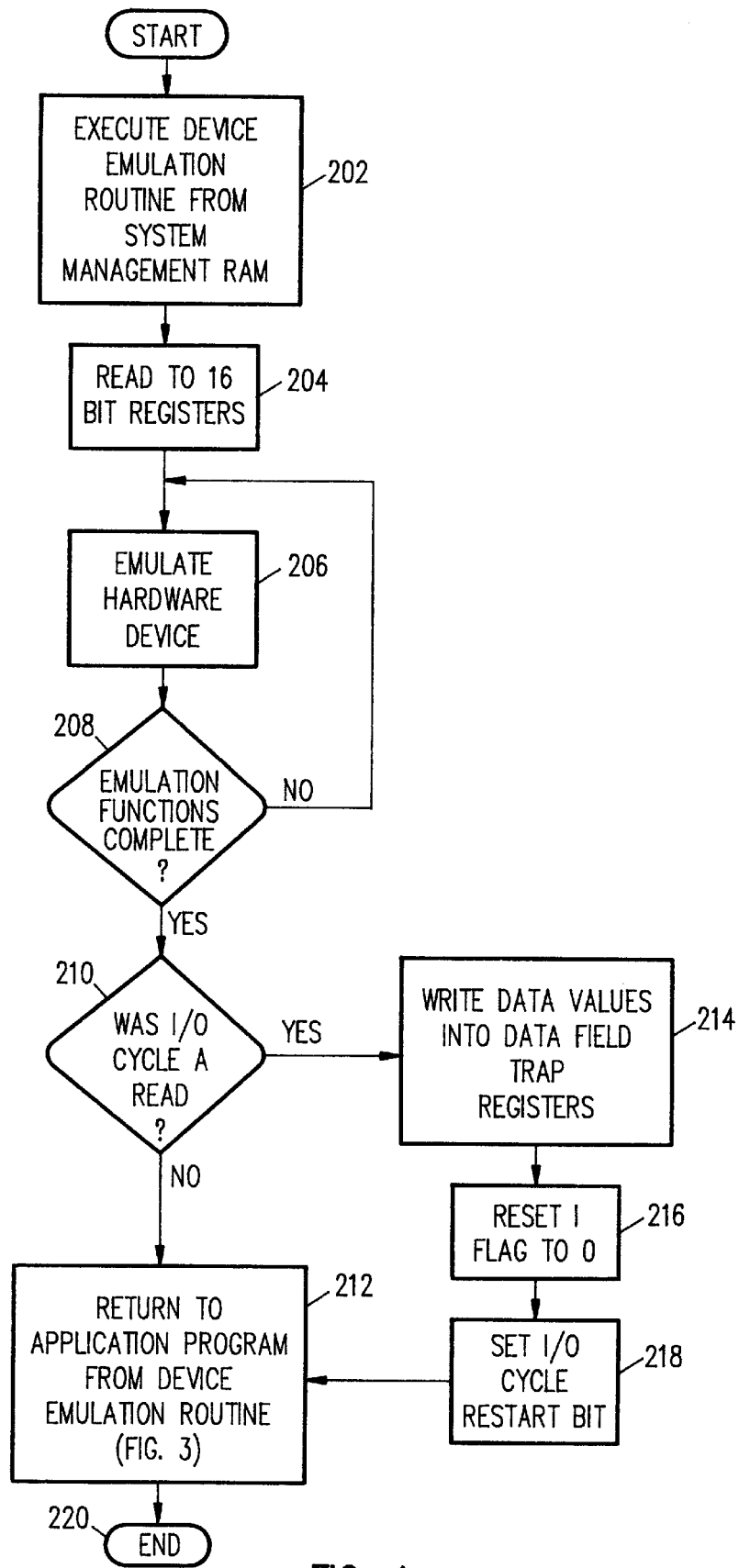

Refer to FIG. 4. The device emulation routine found in system management RAM is executed (202). The emulation routine reads the two 16 bit SMM trap access ports (204) and the emulation routine emulates the hardware device (206). After the emulation functions are completed (208) and if the I/O cycle issued by the application program was a read cycle (210), the program returns to the application program (212) of FIG. 3, and the emulation routine terminates (220).

Resumed Application Program Flow

Refer to FIG. 3. At block (160), after the program returns from the emulation program of FIG. 4, the program exits SMM (162), and the software checks the I/O restart bit (164). If the I/O restart bit is not set, the software passes control back to the application program (166). The application program assumes that the hardware port has been written and resumes execution (166).

If the I/O restart bit is set (164), the previous read cycle is retried before control is passed back to the application program. The trap address decode sets EN1 to 1 (168) which enables the data and address gates and the command decode. The command decode sets the DIR signal off to 0 for read (170). Address and the direction bit are latched into the trap register (172). Data from the data field of the trap register is put on the data bus (174). This time the data is valid. The EN2 bit is set to 0 to disable the SMI generator. At the end of the cycle (EOC), EN1 is on, EN2 is off and EOC is asserted (178). This causes the I flag set block to assert the S signal which causes the I bit to be set to 1. The bus read cycle terminates (184) and control passes back to the application program. The application notes that the hardware port has been read and continues execution (166) with the data that was returned.

While the invention has been particularly shown and described with reference to preferred embodiments thereof, it will be understood by those skilled in the art that the foregoing and other changes in form and detail may be made therein without departing from the scope of the invention.

What is claimed is:

1. An apparatus comprising:
   a microprocessor having a plurality of operational modes including a system management mode, said microprocessor including a device emulator stored in a memory associated with said microprocessor;
   an address bus;
   a data bus;
   a control bus that includes an interrupt line;
   a trap mechanism coupled to said address bus, to said data bus and to said control bus, said trap mechanism including a first indicator indicating whether to issue an interrupt on a next trap hit;
   wherein said trap mechanism includes a first logic coupled to said address bus, to said interrupt line, and to said first indicator, wherein said first logic is operative to assert said interrupt line only if both an address within a specified address range has occurred on said address bus and said first indicator is set to indicate an interrupt is to be issued on the next trap hit; and
   wherein, in response to the assertion of said interrupt line, said microprocessor enters said system management mode and invokes said device emulator.

2. The apparatus of claim 1 wherein:
   said microprocessor includes an I/O restart indicator and wherein said microprocessor invokes an I/O restart operation if said I/O restart indicator is set; and
   said trap mechanism places said data on said data bus if an address within said specified address range has occurred on said address bus.

3. The apparatus of claim 1 further comprising:
   an end of cycle (EOC) line;
   said EOC line being asserted indicating an end of a bus cycle;
   a second logic connected to said address bus, to said EOC and to said first indicator; and
   said first indicator being set by said second logic if both an address within said specified address range has occurred on said address bus and said EOC line is asserted.

4. The apparatus of claim 2 further comprising:
   an end of cycle (EOC) line;
   said EOC line being asserted indicating an end of a bus cycle;
   a second logic connected to said address bus, to said EOC and to said first indicator; and
   said first indicator being set by said second logic if both an address within said specified address range has occurred on said address bus and said EOC line is asserted.

5. A method for software emulation of hardware functions in a computer system, the method comprising the steps of:
   (a) obtaining a first address from a bus, wherein the first address is part of a bus cycle corresponding to a request issued on the bus;
   (b) comparing the first address to a set of one or more addresses;
   (c) asserting an interrupt signal only if both the first address matches an address of the set of one or more addresses and a first indicator is set to indicate an interrupt is to be issued on a next trap hit, the interrupt signal causing a microprocessor, resident within the computer system, to enter a system management mode and initiate the execution of a hardware device emulator; and
   (d) terminating the bus cycle upon completion of the emulator.

6. The method of claim 5, further comprising the steps of:
   responding to the request with incorrect data;
   clearing the first indicator; and
   re-trying the request upon completion of the emulator.

7. The method of claim 6, further comprising the steps of:
   obtaining a second address from the bus, wherein the second address corresponds to the re-tried request; and
   responding to the re-tried request with correct data.

8. The method of claim 7, wherein the step of responding to the re-tried request comprises placing the correct data on the bus in the absence of asserting the interrupt signal.

9. The method of claim 7, further comprising the step of receiving the correct data from the emulator.

10. The method of claim 5, wherein the emulator is an emulation program stored in a memory of the computer system.

11. An apparatus comprising:

a controller having a plurality of operating modes including a system management mode;

a decoder to compare a first address to a set of one or more addresses and to provide a first indication which indicates whether the first address is one of the set of one or more addresses, wherein the first address corresponds to a request issued on a bus;

a second indication which indicates whether to issue an interrupt on a next trap hit; and a trap logic control, coupled to the decoder and the second indication, to assert an interrupt signal only if both the first indication indicates the first address is one of the set of one or more addresses and the second indication indicates to issue an interrupt on the next trap hit, wherein said controller, in response to the assertion of said interrupt line, enters said system management mode and invokes a hardware device emulator.

12. The apparatus of claim 11, further comprising:

an address register; and a data gate, coupled to the address register, to provide data from the address register to the bus.

13. The apparatus of claim 12, wherein the data gate provides incorrect data in response to the request.

14. The apparatus of claim 12, further comprising:

one or more registers which store the set of one or more addresses.

15. An apparatus for assisting software emulation of hardware functions in a computer system, the apparatus comprising:

means for obtaining a first address from a bus, wherein the first address is part of a bus cycle corresponding to a request issued on the bus;

means for comparing the first address to a set of one or more addresses;

means for asserting an interrupt signal only if both the first address matches an address of the set of one or more addresses and a first indicator is set to indicate an interrupt is to be issued on a next trap hit, the interrupt signal causing a controller, resident in the computer system, to enter a system management mode and initiate execution of an emulator; and means for terminating the bus cycle upon completion of the emulator.

16. The apparatus of claim 15, further comprising:

means for responding to the request with incorrect data;

means for clearing the first indicator; and means for re-trying the request upon completion of the emulator.

17. The apparatus of claim 16, further comprising:

means for obtaining a second address from the bus, wherein the second address corresponds to the re-tried request; and means for responding to the re-tried request with correct data.

18. The apparatus of claim 17, wherein the means for responding to the re-tried request comprises means for placing the correct data on the bus in the absence of asserting the interrupt signal.

19. The apparatus of claim 17, further comprising means for receiving the correct data from the emulator.

20. The apparatus of claim 15, wherein the emulator is an emulation program stored in a memory of the computer system.

21. A computer system comprising:

a bus; and a mechanism coupled to said bus, said mechanism including:

a decoder to compare a first address to a set of one or more addresses and to provide a indication which indicates whether the first address is one of the set of one or more addresses, wherein the first address corresponds to a request issued on the bus, a second indication which indicates whether to issue an interrupt on a next trap hit, and a trap control logic, coupled to the decoder and the second indication, to assert an interrupt signal only if both the first indication indicates the first address is one of the set of one or more addresses and the second indication indicates to issue an interrupt on the next trap hit, wherein said interrupt causes a resident controller to enter a system management mode in which software emulation of a hardware device is invoked.

22. The computer system of claim 21, wherein the resident microprocessor, coupled to the bus, is operative to issue the request on the bus.

* * * * *

UNITED STATES PATENT AND TRADEMARK OFFICE
CERTIFICATE OF CORRECTION

PATENT NO.    : 5,970,237  
DATED         : October 19, 1999  
INVENTOR(S)   : Nagaraj et al.

It is certified that error appears in the above-identified patent and that said Letters Patent is hereby corrected as shown below:

Column 2,
Line 29, after second occurrence of "flag", insert -- register and --.

Signed and Sealed this

Third Day of June, 2003

JAMES E. ROGAN
*Director of the United States Patent and Trademark Office*